United States Patent
Li et al.

(10) Patent No.: US 11,513,825 B2
(45) Date of Patent: Nov. 29, 2022

(54) SYSTEM AND METHOD FOR IMPLEMENTING TRUSTED EXECUTION ENVIRONMENT ON PCI DEVICE

(71) Applicant: VMware, Inc., Palo Alto, CA (US)

(72) Inventors: Ye Li, Newton, MA (US); David Ott, Chandler, AZ (US); Cyprien Laplace, Boston, MA (US); Andrei Warkentin, North Andover, MA (US); Alexander Fainkichen, Southborough, MA (US)

(73) Assignee: VMWARE, INC., Palo Alto, CA (US)

( * ) Notice: Subject to any disclaimer, the term of this patent is extended or adjusted under 35 U.S.C. 154(b) by 469 days.

(21) Appl. No.: 16/671,086

(22) Filed: Oct. 31, 2019

(65) Prior Publication Data

US 2021/0132968 A1    May 6, 2021

(51) Int. Cl.
| | |
|---|---|
| G06F 9/54 | (2006.01) |
| G06F 9/455 | (2018.01) |
| G06F 9/30 | (2018.01) |
| G06F 13/42 | (2006.01) |

(52) U.S. Cl.
CPC .......... G06F 9/455 (2013.01); G06F 9/30007 (2013.01); G06F 9/30043 (2013.01); G06F 9/30098 (2013.01); G06F 9/546 (2013.01); G06F 13/4221 (2013.01); G06F 2213/0024 (2013.01)

(58) Field of Classification Search
None
See application file for complete search history.

(56) References Cited

U.S. PATENT DOCUMENTS

| | | | |
|---|---|---|---|
| 6,968,409 B1 * | 11/2005 | Solomon | G06F 13/385 710/310 |
| 9,792,143 B1 | 10/2017 | Potlapally et al. | |
| 2015/0149996 A1 * | 5/2015 | Tsirkin | G06F 9/45558 718/1 |
| 2021/0133140 A1 * | 5/2021 | Jeansonne | G06F 13/4221 703/23 |

OTHER PUBLICATIONS

Intel, "Intel Software Guard Extensions Programming Reference", Oct. 2014, 168 pgs.
ARM Developer, "ARM: Architecture Reference Manual: ARMv8, for ARMv8—a architecture profile", 2015, 8128 pgs.
Intel "Intel Architecture Memory Encryption Technologies Specification", Ref: #336907-001US, Rev: 1.1, Dec. 2017, 30 pgs.
AMD, "AMD Secure Encrypted Virtualization (SEV)", https://developer.amd.com/amd-secure-memory-encryption-sme-amd-secure-encrypted-virtualization-sev/, retrieved Jun. 26, 2020, 10 pgs.

* cited by examiner

*Primary Examiner* — Craig C Dorais
(74) *Attorney, Agent, or Firm* — Loza & Loza, LLP (57) ABSTRACT

System and method for providing trusted execution environments uses a peripheral component interconnect (PCI) device of a computer system to receive and process commands to create and manage a trusted execution environment for a software process running in the computer system. The trusted execution environment created in the PCI device is then used to execute operations for the software process.

20 Claims, 9 Drawing Sheets

FIG. 1

| Offset | Bits 31 - 24 | Bits 23 - 16 | Bits 15 - 8 | Bits 7 - 0 |
|---|---|---|---|---|
| 00 | Device ID: 0x0840 | | Vendor ID: 0x15AD | |
| 04 | Status: 0x10 | | Command: 0x0 | |
| 08 | Class: 0x08 | Subclass: 0x40 | Prog ID: 0x00 | Revision ID: 0x00 |
| 0C | BIST: 0x00 | Header: 0x00 | Latency: 0x00 | Cache Line: 0x00 |
| 10 | Base Address #0: 0xFFFFF000 | | | |
| 14 | Base Address #1: 0x00000000 | | | |
| 18 | Base Address #2: 0x00000000 | | | |
| 1C | Base Address #3: 0x00000000 | | | |
| 20 | Base Address #4: 0x00000000 | | | |
| 24 | Base Address #5: 0x00000000 | | | |
| 28 | Cardbus CIS Pointer | | | |
| 2C | Subsystem ID: 0x0840 | | Subsystem Vendor ID: 0x15AD | |
| 30 | Expansion ROM base address: 0x0 | | | |
| 34 | RSVD | | | Cap Ptr: 0x40 |
| 38 | RSVD | | | |
| 3C | Max Lat: 0x00 | Min Grant: 0x00 | Int Pin: 0x00 | Int Line: 0x00 |
| 40 | Message Control: 0x0182 | | Next Cap: 0x00 | Cap ID: 0x05 |
| 44 | Message Address Low | | | |
| 48 | Message Address High | | | |
| 4C | Message Data | | | |
| 50 | Mask Bits | | | |
| 54 | Pending Bits | | | |

FIG. 2

| Offset | Name | Type | Reset | Description |
|---|---|---|---|---|
| 0x00 | SE_CTRL | RW | 0x0 | SE Control Register |
| 0x04 | SE_IDR | RO | Implementation Defined | SE ID Register |
| 0x08 | SE_INFOR1 | RO | Implementation Defined | SE Info Register 1 |
| 0x10 | SE_INFOR2 | RO | Implementation Defined | SE Info Register 2 |
| 0x14 | SE_STATUS | RW | 0x0 | SE Status Register |
| 0x18 | RESERVED | | | |
| 0x20 | SE_CBASE | RW | 0x0 | SE Command Queue Base Register |
| 0x28 | SE_CPROD | RW | 0x0 | SE Command Queue Producer Register |
| 0x30 | SE_CCON | RO | 0x0 | SE Command Queue Consumer Register |
| 0x38 | SE_EBASE | RW | 0x0 | SE Event Queue Base Register |
| 0x40 | SE_EPROD | RO | 0x0 | SE Event Queue Producer Register |
| 0x48 | SE_ECON | RW | 0x0 | SE Event Queue Consumer Register |

| Offset | Bits [63:32] | Bits [31:8] | | Bits [7:0] |
|---|---|---|---|---|
| 0x00 | RESULT | Reserved | C | FID |
| 0x08 | PARAM2 | PARAM1 | | |
| 0x10 | PARAM3 | | | |
| 0x18 | PARAM4 | | | |

FIG. 5

| Offset | Bits [63:32] | Bits [31:8] | Bits [7:0] |
|--------|--------------|-------------|------------|
| 0x00   | Enclave ID   | Reserved    | Reason     |
| 0x08   |              | PARAM1      |            |
| 0x10   |              | PARAM2      |            |
| 0x18   |              | PARAM3      |            |

SYSTEM AND METHOD FOR IMPLEMENTING TRUSTED EXECUTION ENVIRONMENT ON PCI DEVICE

BACKGROUND

Developers of secure applications seek to protect selected code and data from disclosure or modification by processes running on the same system. Such processes may be running at the same or a higher privilege level. Example applications with these requirements include secure web browsing, digital rights management (DRM), and e-commerce applications.

To address this problem, the notion of a trusted execution environment, or TEE, has been developed in recent years. Broadly, a TEE provides a set of features or mechanisms that are useful in isolating code and data, and in verifying the integrity of what is running on the system. One recent development of interest is Intel® Software Guard Extension (SGX), which is a recent platform technology that implements a TEE solution entirely in hardware. Essentially, Intel® SGX supports the creation of isolated memory environments, or secure enclaves, that any application on the system can use to protect code and data from all other processes running on the system. Memory enclaves are encrypted and ensure confidentiality and code integrity even if the operating system is compromised. Attestation services are also provided by the SGX hardware to verify the authenticity of the platform and integrity of a given enclave. Performance is also an advantage of this hardware-based solution.

While Intel® SGX is a notable contribution to the TEE technologies, the known hardware-based solutions suffer from numerous disadvantages. Some of these disadvantages include (1) the slow pace of hardware feature development, release, and deployment, (2) security applications become tied to platform features that are hard to remediate if and when vulnerabilities are discovered, (3) TEE features, which are offered as a proprietary platform solution, are not universally available (often even across products offered by the same vendor, e.g., not all Intel CPUs support SGX), and (4) platform-based hardware solutions may lack cross-platform compatibility which is needed for infrastructure management solutions (e.g., hardware solutions may not support virtual machine (VM) migration of VMware products, which would prevent enclave migration).

BRIEF DESCRIPTION OF THE DRAWINGS

Throughout the description, similar reference numbers may be used to identify similar elements.

DETAILED DESCRIPTION

Figure 1:
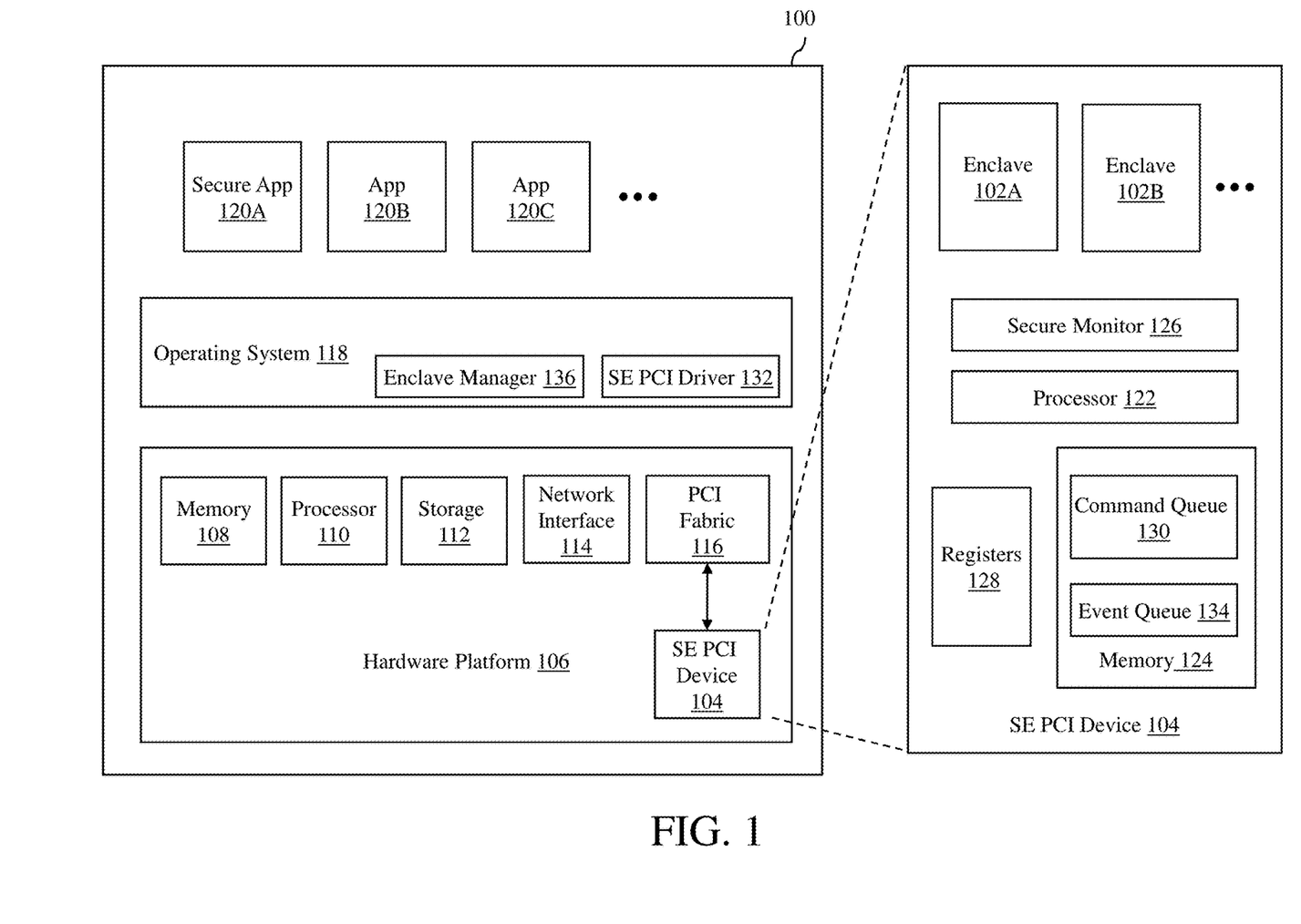
FIG. 1 is a block diagram of a computer system with a secure enclave (SE) peripheral component interconnect (PCI) device in accordance with an embodiment of the invention.

FIG. 1 depicts a computer system 100 in accordance with an embodiment of the invention. The computer system 100 provides a cross-platform trusted execution environment (TEE) solution that is exposed through standard peripheral component interconnect (PCI) interfaces. As explained below, TEE in the form of secure memory enclaves 102 are created in one or more secure enclave (SE) PCI devices 104 of the computer system. This solution addresses the disadvantages described above with respect to the Intel® SGX solution. The PCI device solution can increase the pace of hardware feature development, release, and deployment when compared to the Intel® SGX solution, can provides platform independence, can be universally available and allows for cross-platform compatibility.

As shown in FIG. 1, the computer system 100 includes a physical hardware platform 106, which include components commonly found in a server-grade or personal computer. The physical hardware platform 106 includes at least one or more system memories 108, one or more processors 110, a storage 112, and a network interface 114, and a PCI Fabric 116. Each system memory 108, which may be random access memory (RAM), is the volatile memory of the computer system 100. Each processor 110 can be any type of a processor, such as a central processing unit (CPU) commonly found in a personal computer. The storage 112 can be any type of non-volatile computer storage with one or more storage devices, such as a solid-state devices (SSDs) and hard disks. Although the storage 112 is shown in FIG. 1 as being a local storage, in other embodiments, the storage 112 may be a remote storage, such as a network-attached storage (NAS). The network interface 114 is an interface that allows the computer system 100 to communicate with other devices through one or more computer networks. As an example, the network interface may be a network interface controller (NIC). The PCI fabric 116 is an interface to connect the SE PCI device 104 to the other components of the computer system 100, such as the processor 110. The PCI fabric 116 may include a root complex, buses and a switch so that one or more PCI devices can connected to the PCI fabric. The PCI fabric 116 may be included in a motherboard (not shown) to which the other hardware components of the computer system are connected. In an embodiment, the PCI fabric supports PCI Express (PCI-E) and the SE PCI device 104 is a PCI-E device.

As shown in FIG. 1, the computers system 100 further includes an operating system 118, which can support various software applications 120 (e.g., software applications 120A, 120B, 120C . . . ). The operating system 118 can be any known operating system, such as Microsoft Windows or Linux-based operating system. The applications 120 can be any software programs, processes or routines running on the operating system 118. Some of these applications 120 may need to protect sensitive content, such as codes and/or data. As used herein, codes of sensitive content may refer to computer codes that can execute software routines, and data of sensitive content may refer to any confidential information, such as encryption keys. As an example, one of the applications 120 shown in FIG. 1 is labeled as a secure application 112A, which may need to protect sensitive content in a trusted execution environment, (TEE). This TEE for the secure application 120A is provided by the SE PCI device 104 in the form of one or more secure memory enclaves 102 (e.g., enclaves 102A, 102B . . . ). As an example, the memory enclave 102A may be used by the secure application 120A to store sensitive content.

The SE PCI device 104 is a standard physical PCI device that is connected to the PCI fabric 116 to communicate with the applications 120 that require the use of enclaves. The SE PCI device 104 may be physically connected to the PCI fabric 116 via a PCI slot on a motherboard of the computer system 100. As illustrated, the SE PCI device 104 includes a processor 122 and memory 124 to manage the secure memory enclaves 102 that are created in the PCI device. The processor 122 can be any type of a processor commonly found in a small electronic device, such as a signal processor or a microcontroller. The memory 124 can be any volatile memory, such as DRAM. The SE PCI device 104 further includes a secure monitor 126, which is a trusted software that works with the hardware of the SE PCI device to provide TEE environments in the form of secure enclaves. In an embodiment, the secure monitor 126 may be implemented as firmware.

Figure 2:
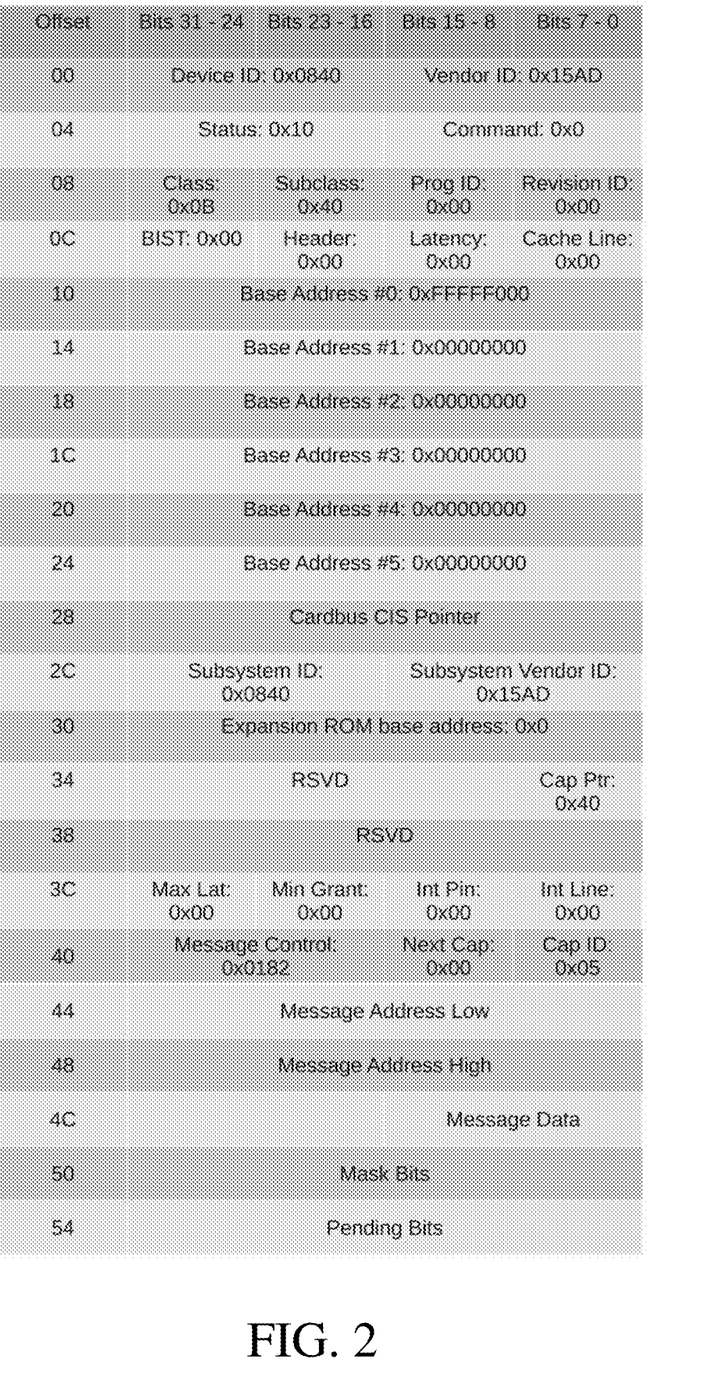
FIG. 2 shows PCI configuration space registers supported by the SE PCI device and their reset values in accordance with an embodiment of the invention.

The SE PCI device 104 includes a number of registers 128 that expose a command interface for issuing secure monitor application programming interfaces (APIs). In an embodiment, the registers 128 are memory-mapped input/output (MIMO) registers. Like any other standard PCI devices, the registers 128 include PCI configuration space registers. In FIG. 2, the PCI configuration space registers supported by the SE PCI device 104 and their reset values in accordance with an embodiment of the invention are shown.

Figure 3:
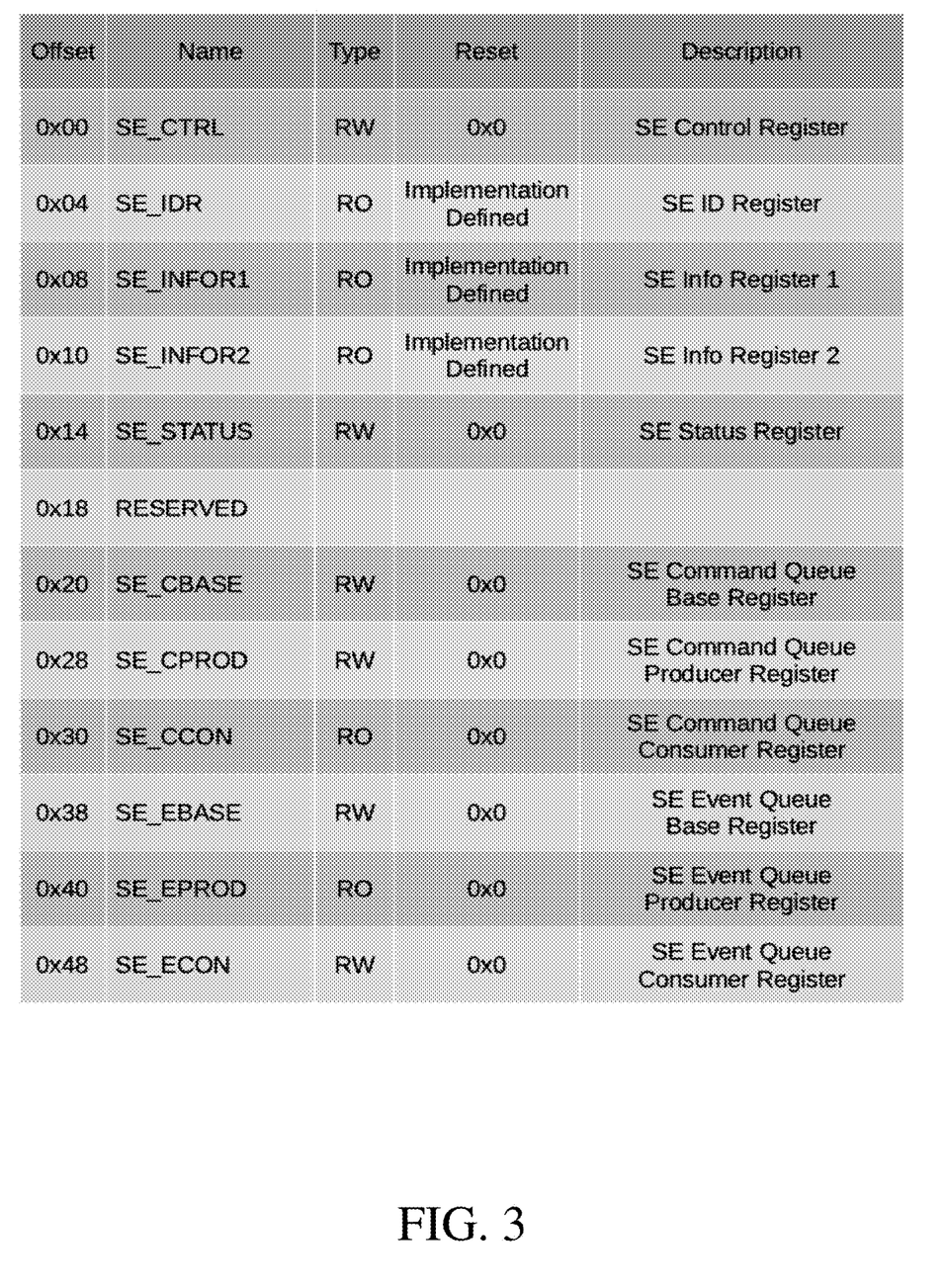
FIG. 3 shows PCI device registers of the SE PCI device in accordance with an embodiment of the invention.

In an embodiment, the SE PCI device 104 supports two (2) message signaled interrupts (MSIs) for command completion and event handling. The first PCI Base Address Register (BAR) points to the base address of the memory mapped device registers, as illustrated in FIG. 3, which shows PCI device registers of the SE PCI device 104 in accordance with an embodiment of the invention. As shown in FIG. 3, the PCI device registers includes a number of registers, which are described below.

The control register (SE CTRL) is used to disable/enable device function and interrupts. The bits of this register are used as follows:

Bit 31:3 Reserved.

Bit 2 Enable event notification interrupt when 1 is written.

Bit 1 Enable command descriptor completion interrupt when 1 is written.

Bit 0 Enable the PCI device when 1 is written.

The identification register (SE IDR) is used to get PCI device version information. The bits of this register are used as follows:

Bit 31:16 Reserved.

Bit 15:8 Device major version number.

Bit 7:0 Device minor version number.

The information register 1 (SE INFOR1) is used to get PCI device information. The bits of this register are used as follows:

Bit 31:0 Number of 4K pages available for all enclaves.

The information register 2 (SE INFOR2) is also used to get PCI device information. The bits of this register are used as follows:

Bit 31:0 Maximum number of enclaves supported.

The device status register (SE STATUS) is used to get PCI device status. The bits of this register are used as follows:

Bit 31:6 Reserved.

Bit 5 When set to 1, event descriptor MSI error occurred.

Bit 4 When set to 1, event descriptor error occurred.

Bit 3 When set to 1, device event queue is stalled.

Bit 2 When set to 1, command descriptor MSI error occurred.

Bit 1 When set to 1, command descriptor error occurred.

Bit 0 When set to 1, device command queue is stalled.

The command queue base address register (SE CBASE) is used to set command queue base and size. The bits of this register are used as follows:

Bit 63:52 Reserved.

Bit 51:12 Command queue base physical address.

Bit 11:8 Reserved.

Bit 7:0 The number minus one of 4 KB pages of physical memory allocated to the command queue.

The command queue producer register (SE CPROD) is used by software to point to the offset in the command queue where the next command will be written. The bits of this register are used as follows:

Bit 63:20 Reserved.

Bit 19:0 Offset from SE CBASE. Since the command descriptor is 32 bytes long, Bit[4:0] must be 0.

The command queue consumer register (SE CCON) is advanced by hardware to point to the offset in the command queue where the PCI device reads the next command. The bits of this register are used as follows:

Bit 63:20 Reserved.

Bit 19:0 Offset from SE CBASE. Since the command descriptor is 32 bytes long, Bit[4:0] must be 0.

The event queue base address register (SE EBASE) is used to set event queue base and size. The bits of this register are used as follows:

Bit 63:52 Reserved.

Bit 51:12 Event queue base physical address.

Bit 11:8 Reserved.

Bit 7:0 The number minus one of 4 KB pages of physical memory allocated to the event queue.

The event queue producer register (SE EPROD) is advanced by hardware to point to the offset in the event queue where the next event will be written. The bits of this register are used as follows:

Bit 63:20 Reserved.

Bit 19:0 Offset from SE EBASE. Since the event descriptor is 32 bytes long, Bit[4:0] must be 0.

The event queue consumer register (SE ECON) is used by software to point to the offset in the event queue where the software reads the next event. The bits of this register are used as follows:

Bit 63:20 Reserved.

Bit 19:0 Offset from SE EBASE. Since the Event Descriptor is 32 bytes long, Bit[4:0] must be 0.

The command interface of the SE PCI device 104 is provided through a command queue 130 in the memory 124. A SE PCI device driver 132 installed in the operating system 118 allocates a region in the memory 124 for the command queue 130 and configures the SE CBASE register to point to the beginning of the region. Software, such as the secure application 120A, via the operating system 118 can issue commands to the SE PCI device 104 by creating a command descriptor data structure and copying the descriptor into the command queue 130 via an enclave manager 136, which may be installed in the operating system 118. In an embodiment, the enclave manager 136 operates to manage the processes to create and manage enclaves in the SE PCI device using various commands for the applications 120. The different commands that can be issued are described below. The SE CPROD register is used by the SE PCI driver 132 to point the hardware to the most recent command created by the software in the command queue. This notifies the hardware of newly created commands for consumption. The SE CCON is advanced by the hardware to always point to the most recent processed command in the command queue 130.

Figure 4:
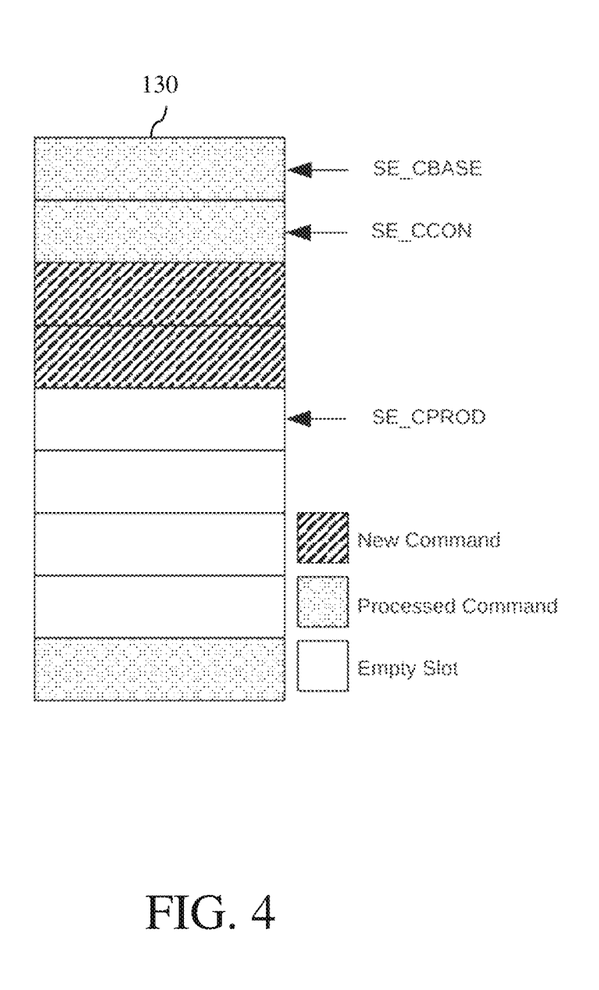
FIG. 4 shows an exemplary status snapshot of a command queue in the SE PCI device in accordance with an embodiment of the invention.

FIG. 4 shows an exemplary status snapshot of the command queue 130 in accordance with an embodiment of the invention. As shown in FIG. 4, the SE CBASE register points to the beginning of the command queue 130, i.e., the top of the command queue. The SE CPROD register points to the most recent command inserted or added into the command queue 130, which in the example shown in FIG. 4 is the fifth slot from the top of the command queue. The SE CCON register points to the most recent processed command in the command queue 130, which in the example shown in FIG. 4 is the second slot from the top of the command queue. As commands are added and processed, the SE CPROD and SE CCON registers point to the different commands in the command queue 130. Thus, the command queue 130 is essentially treated as a ring buffer with the SE PCI device 104 as the consumer and the SE PCI driver 132 as the producer.

Figure 5:
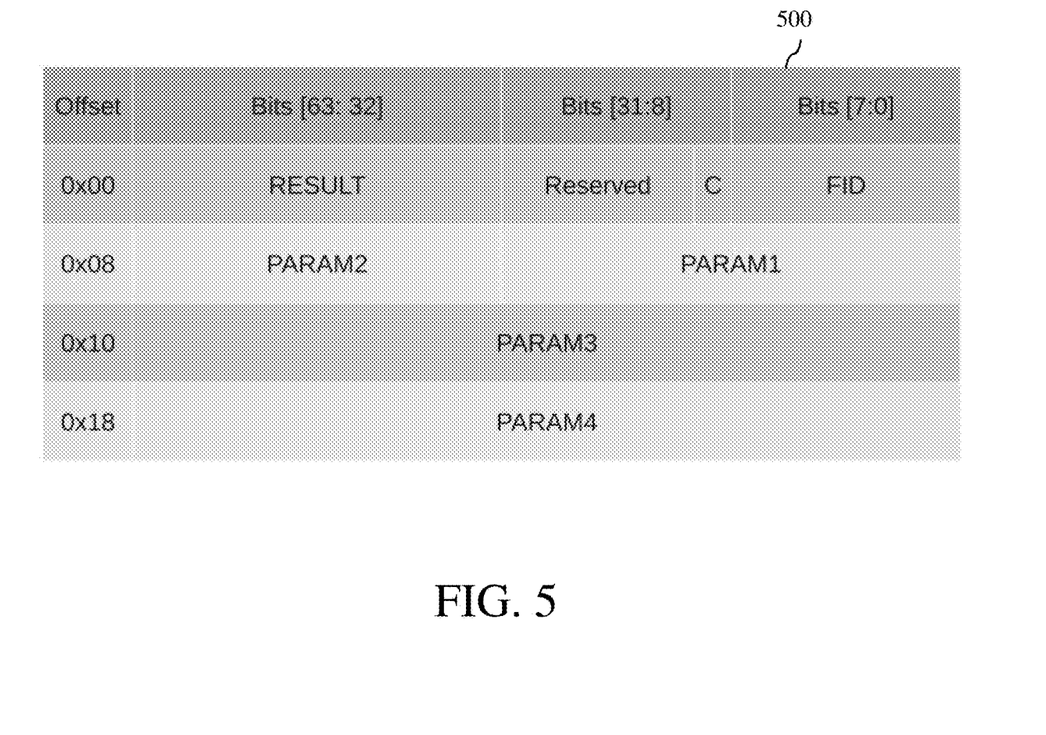
FIG. 5 shows a command descriptor data structure used by the SE PCI device in accordance with an embodiment of the invention.

In an embodiment, the commands supported by the SE PCI device 104 are in the form of a command descriptor data structure 500, which is illustrated in FIG. 5. In this embodiment, the command descriptor data structure 500 is 32 bytes in size. The command description data structure 500 includes the following fields: RESULT, Reserved, C (completion), FID, PARAM1, PARAM2, PARAM3 and PARAM4. The FID (function identification) field is used to choose which command to invoke with respect to an enclave, which will be assigned a unique ID. The C (Completion) bit is reset by software before submitting the command and set to 1 when the command is completed by the hardware. The RESULT field contains the return value of the command, which can be an error code whenever error has occurred. The rest of the descriptor data structure 500 contains variable number of parameters that varies for each specific command. The specific commands that can be issued and executed include, but not limited to, the following commands.

An enclave creation command (SE ECREATE) is used to create an enclave. This command includes the following information.
   FID 0.
   RESULT Error Code if any. 0 on success.
   PARAM1 Implementation defined enclave identification (output).

A destroy an enclave command (SE EDESTROY) is used to destroy an existing enclave. The enclave must be stopped or not initialized. All the memory pages allocated also must be freed before calling this function. This command includes the following information.
   FID 1.
   RESULT Error Code if any. 0 on success.
   PARAM1 Implementation defined enclave identification.

A map secure memory into enclave command (SE EMAPSECURE) is used to map secure memory into an enclave. This command includes the following information.
   FID 2.
   RESULT Error Code if any. 0 on success.
   PARAM1 Implementation defined enclave identification.
   PARAM2 Secure memory page number.
   PARAM3 Secure memory virtual address used for the mapping. Page aligned. Bit 2:0 are permissions. Read 0x1, Write 0x2, Exec 0x4.
   PARAM4 Host physical address containing the page content.

A map insecure (Normal DRAM) memory into enclave command (SE EMAPINSECURE) is used to map normal DRAM memory into an enclave. This command includes the following information.
   FID 3.
   RESULT Error Code if any. 0 on success.
   PARAM1 Implementation defined enclave identification.
   PARAM3 Secure memory virtual address used for the mapping. Page aligned. Bit 2:0 are permissions. Read 0x1, Write 0x2, Exec 0x4.
   PARAM4 Host physical address to be mapped.

A finalize enclave construction and mark ready for execution command (SE EFINALIZE) is used to finalize the enclave construction after all the pages are mapped and mark the enclave as executable. Before finalization, the PCI device checks the internal measurement of the enclave and makes sure it matches the given measurement. If the measurements do not match, this command will return "failure". This command includes the following information.
   FID 4.
   RESULT Error Code if any. 0 on success.
   PARAM1 Implementation defined enclave identification.
   PARAM3 Host buffer physical address containing the expected enclave measurement.

An enter an enclave to start execution command (SE EENTER) is used to start execution of an enclave. This command includes the following information.
   FID 5.
   RESULT Error Code if any. 0 on success.
   PARAM1 Implementation defined enclave identification.
   PARAM2 Argument 1 passed to the enclave.
   PARAM3 Argument 2 passed to the enclave.
   PARAM4 Secure memory virtual address for entry.

A resume enclave execution command (SE ERESUME) is used to resume execution of a previously started (and exited) enclave. This command includes the following information.
   FID 6.
   RESULT Error Code if any. 0 on success.
   PARAM1 Implementation defined enclave identification.

A stop an enclave command (SE ESTOP) is used to stop an enclave. When executed, the command marks the enclave as non-executable. Note: an enclave can only be stopped after the enclave has been exited. This command includes the following information.
   FID 7.
   RESULT Error Code if any. 0 on success.
   PARAM1 Implementation defined enclave identification.

A free secure memory command (SE EREMOVE) is used to free a secure page from an enclave. Secure pages can only be freed when an enclave using them are stopped. This command includes the following information.

FID 8.

RESULT Error Code if any. 0 on success.

PARAM1 Implementation defined enclave identification.

PARAM2 Secure memory page number.

An allocate secure memory command (SE EALLOC) is used to allocate a secure page for enclave use. The page number for the secure page will most likely be used later for SE EMAPSECURE or SE EMAPINSECURE commands. This command includes the following information.

FID 9.

RESULT Error Code if any. 0 on success.

PARAM1 Implementation defined enclave identification.

PARAM2 Secure memory page number (output).

A setup sealing context command (SE ESEALSETUP) is used to set up the sealing context for a given enclave. The SE ESEAL command can be used after the setup to seal enclave pages to external storage. A key from a remote identity (e.g. a remote machine with a PCI device) is needed to generate the sealing key using the Diffie-Hellman (DH) key exchange protocol or another key exchange protocol. This sealing key will be stored internally by the device and be associated with the given enclave until SE ESEALFIN is called. The sealed pages can only be unsealed by the remote identity in the future. This command includes the following information.

FID 10.

RESULT Error Code if any. 0 on success.

PARAM1 Implementation defined enclave identification.

PARAM3 Host physical address of the input keys (certificates). The exact number of keys needed is implementation defined. However, it will at least include the remote key for DH key exchange.

PARAM4 Host physical address of output buffer containing session data used to avoid replay attack.

A seal enclave page command (SE ESEAL) is used to seal enclave pages after setting up the sealing context. This command includes the following information.

FID 11.

RESULT Error Code if any. 0 on success.

PARAM1 Implementation defined enclave identification.

PARAM2 Secure memory page number.

PARAM3 Host physical address for the output buffer containing sealed data and metadata for unsealing (size is implementation defined and will be larger than 1 page).

A destroy sealing context command (SE ESEALFIN) is used to destroy the sealing context for a given enclave set up by SE ESEALSETUP command. This command includes the following information.

FID 12.

RESULT Error Code if any. 0 on success.

PARAM1 Implementation defined enclave identification.

A setup unsealing context command (SE EUNSEALSETUP) is used to set up the unsealing context for a given enclave. The SE EUNSEAL command can be used after the setup to unseal enclave pages from external storage. A key from a remote sealing identity (e.g. a remote machine with a PCI device) is needed to generate the unsealing key using the Diffie-Hellman key exchange protocol or another key exchange protocol. This unsealing key will be stored internally by the device and be associated with the given enclave until SE EUNSEALFIN command is called. This command includes the following information.

FID 13.

RESULT Error Code if any. 0 on success.

PARAM1 Implementation defined enclave identification.

PARAM3 Host physical address of the input keys (certificates). The exact number of keys needed is implementation defined. However, it will at least include the remote key for DH key exchange.

PARAM4 Host physical address of session data used to avoid replay attack.

An unseal enclave page command (SE EUNSEAL) is used to unseal enclave pages after setting up the unsealing context. This command is similar to the SE EMAPSECURE command for sealed pages. This command includes the following information.

FID 14.

RESULT Error Code if any. 0 on success.

PARAM1 Implementation defined enclave identification.

PARAM3 Host physical address for the sealed data and metadata used for unsealing (size is implementation defined and will be larger than 1 page).

A destroy unsealing context command (SE EUNSEALFIN) is used to destroy the unsealing context for a given enclave set up by SE EUNSEALSETUP command. This command includes the following information.

FID 15.

RESULT Error Code if any. 0 on success.

PARAM1 Implementation defined enclave identification.

These commands are all used by the host software (e.g. the operating system 118 or a hypervisor in a virtualization system). The SE PCI device 104 also provides enclave internal APIs for enclave application developers. These APIs can be implemented inside the SE PCI device 104 in various ways. However, the APIs will eventually be wrapped in a developer library in the form of normal function calls that can be used by the enclave code. Examples of enclave internal APIs are listed in the following table.

| Enclave APIs: | |
|---|---|
| void enclave_exit( ) | Exit the enclave execution |
| int32_t map_data(int32_t page_nr, uint64_t base_va, uint8_t perm) | Map a given spare page at the specified virtual address |
| int unmap_data(int32_t page_nr) | Free a previously mapped page |
| bool verify(uint32_t report[ ], uint32_t mac[ ]) | Given report of enclave, verify that the given MAC matches the computed MAC |
| int32_t quote(uint32_t report[ ], uint32_t mac[ ]) | Given report of enclave, produce the MAC |
| uint64_t get random( ) | Hardware source of random numbers |

Turning back to FIG. 1, the SE PCI device 104 also includes an event queue 134 in the memory 124 for asynchronous reporting of events, such as device errors and enclave completion events. The mechanism of the event queue 134 is the same to the command queue 130. The only difference is that the roles of producer and consumer are switched between the SE PCI device 104 and the SE PCI driver 132.

Figure 6:
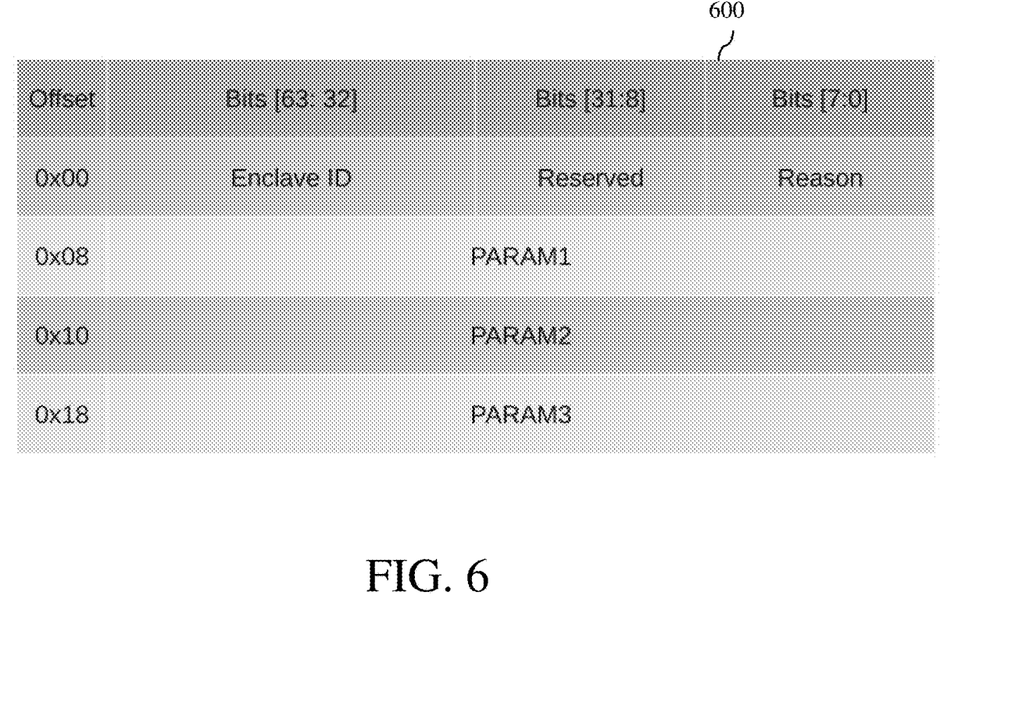
FIG. 6 shows an event descriptor data structure used by the SE PCI device in accordance with an embodiment of the invention.

In an embodiment, the events used by the SE PCI device 104 are in the form of an event descriptor data structure 600, which is illustrated in FIG. 6. In this embodiment, the event descriptor data structure 600 is 32 bytes in size. The event descriptor data structure 600 includes the following fields: Enclave ID, Reserved, Reason, PARAM1, PARAM2, and PARAM3. The reason field in the event descriptor data structure 600 provides the event ID that identifies the event cause. When an event is caused by an enclave, the enclave ID field provides the ID of the causing enclave. The rest of the parameters in the descriptor data structure 600 are event dependent and are described in the event list below, which described two examples of events used by the SE PCI device 104.

An enclave exit event (SE EVENT EXIT) is generated when any enclave has exited. This event includes the following information.

| | |
|---|---|
| Reason | 0. |
| Enclave ID | ID of the enclave that has exited. |
| PARAM1 | Exit code from the enclave. |

An enclave exception event (SE EVENT EXCEPTION) is generated when any enclave has exited due to an exception. This event includes the following information.

| | |
|---|---|
| Reason | 1. |
| Enclave ID | ID of the enclave that exited. |
| PARAM1 | Exception info (Exception number, implementation defined). |
| PARAM2 | Exception data (e.g. Faulting address for page fault). |

Using these commands and events with the registers, the command queue and the event queue, the PCI device is able to create and manage the secure enclaves in the PCI for the secure applications to protect sensitive content, such as codes and/or data. As used herein, codes of sensitive content may refer to computer codes that can execute software routines, and data of sensitive content may refer to any confidential information, such as encryption keys.

Figure 7:
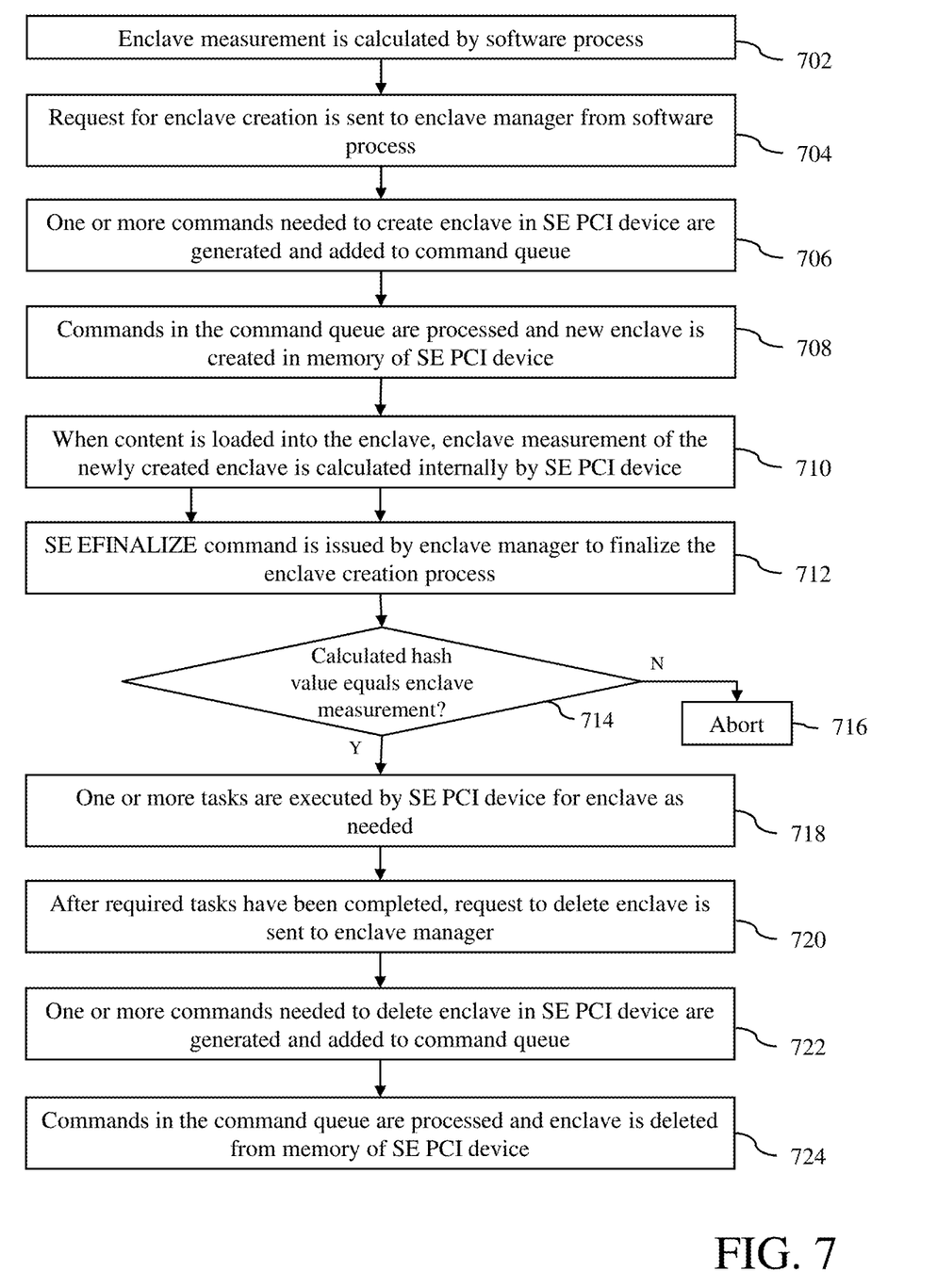
FIG. 7 is a process flow diagram of a process of employing the SE PCI device to provide a trusted execution environment in the computer system in accordance with an embodiment of the invention.

A process of employing the SE PCI device 104 to provide a trusted execution environment in the computer system 100 in accordance with an embodiment of the invention is now described with reference to a process flow diagram of FIG. 7. When a software process, such as the secure application 120A, needs a trusted execution environment for sensitive content, an enclave measurement is calculated by the software process, at step 702. As used herein, an enclave measurement is information that can be used to unique identify an enclave or trusted execution environment represented by an enclave composition/construction log, which includes (1) content to be stored in the trusted execution environment or enclave, e.g., pages of both data and code to be stored, (2) the virtual address mapping of the enclave, and (3) any other security information from user configuration (e.g., page permissions). In an embodiment, the enclave measurement is a hash value of the enclave composition/construction log. In an alternative embodiment, the enclave composition/construction log may be in the form of an internal file.

Next, at step 704, a request for enclave creation is sent to the enclave manager 136 from the software process. In an embodiment, the enclave creation request includes the enclave measurement and the enclave composition/construction log.

At step 706, one or more commands needed to create an enclave in the SE PCI device 104 are generated by the enclave manager 136 and added to the command queue 130 in the SE PCI device 104 using the SE PCI driver 132. Next, at step 708, the commands in the command queue 130 are processed by the secure monitor 126 and a new enclave is created in the memory 124 of the SE PCI device 104 with all the necessary requirements. The content for the new enclave is also loaded into the newly created enclave during this process through the commands. Next, at step 710, when the content is loaded into the enclave, an enclave measurement of the newly created enclave is calculated internally by the SE PCI device 104. When multiple items are added to the enclave, a new enclave measurement is calculated after each added item and the enclave measurement is updated by the SE PCI device 104.

Next, at step 712, after the enclave is created and loaded, an SE EFINALIZE command is issued by the enclave manager 136 to finalize the enclave creation process. The enclave measurement from the user process, which has been passed to the enclave manager 136, is included in the SE EFINALIZE command.

Next, at step 714, a determination is made whether the hash value calculated by the user process is equal to the enclave measurement calculated by the SE PCI device 136 during the enclave creation process. If no, then the process proceeds to step 716, where the operation is aborted since this indicates that the received enclave composition/construction log is not identical to the original enclave composition/construction log due to some change, which may be the result of some error or unauthorized tampering. The process then comes to an end. However, if yes, then the process proceeds to step 718, Next, at step 718, one or more tasks are executed by the SE PCI device 104 for the enclave as needed. The type of tasks executed by the SE PCI device 104 may vary depending on the application of the enclave. Some examples of these tasks include (1) communicating with the requesting software process and/or other software processes, which may reside in the computer system 100 or in other computer systems, (2) executing the code originally loaded into the enclave using the data originally loaded into the enclave or using data from external sources, such as the requesting software process and/or other software processes, which may reside in the computer system or in other computer systems, and (3) executing code subsequently loaded into the enclave from external sources using the data originally loaded into the enclave or using data from external sources, such as the requesting software process and/or other software processes.

Next, at step 720, after the required tasks have been completed, a request to delete the enclave is sent to the enclave manager 136. In an embodiment, the required tasks are completed when a predefined number of tasks have been executed successfully. In other embodiments, the required tasks are completed when the requesting software process no longer has any tasks that require the use of the enclave. Thus, the request to remove the enclave may come from the requesting software process or from the enclave itself.

Next, at step 722, in response to the received enclave removal request, one or more commands needed to delete an enclave in the SE PCI device are generated by the enclave manager 136 and added to the command queue 130 in the SE PCI device 104 using the SE PCI driver 132. Next, at block 724, the commands in the command queue 130 are processed by the secure monitor 126 and the enclave is deleted from the memory of the SE PCI device 104.

In some embodiments, the SE PCI device 104 may be presented as a virtual SE PCI device and/or the secure applications 120 may be applications running in virtual computing instances (VCIs). As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. The VM may be comprised of a set of specification and configuration files and is backed by the physical resources of a physical host computer. Similarly, the virtual SE PCI device is an emulation of an SE PCI device in the form of software that can function and operate as a physical SE PCI device.

Figure 8:
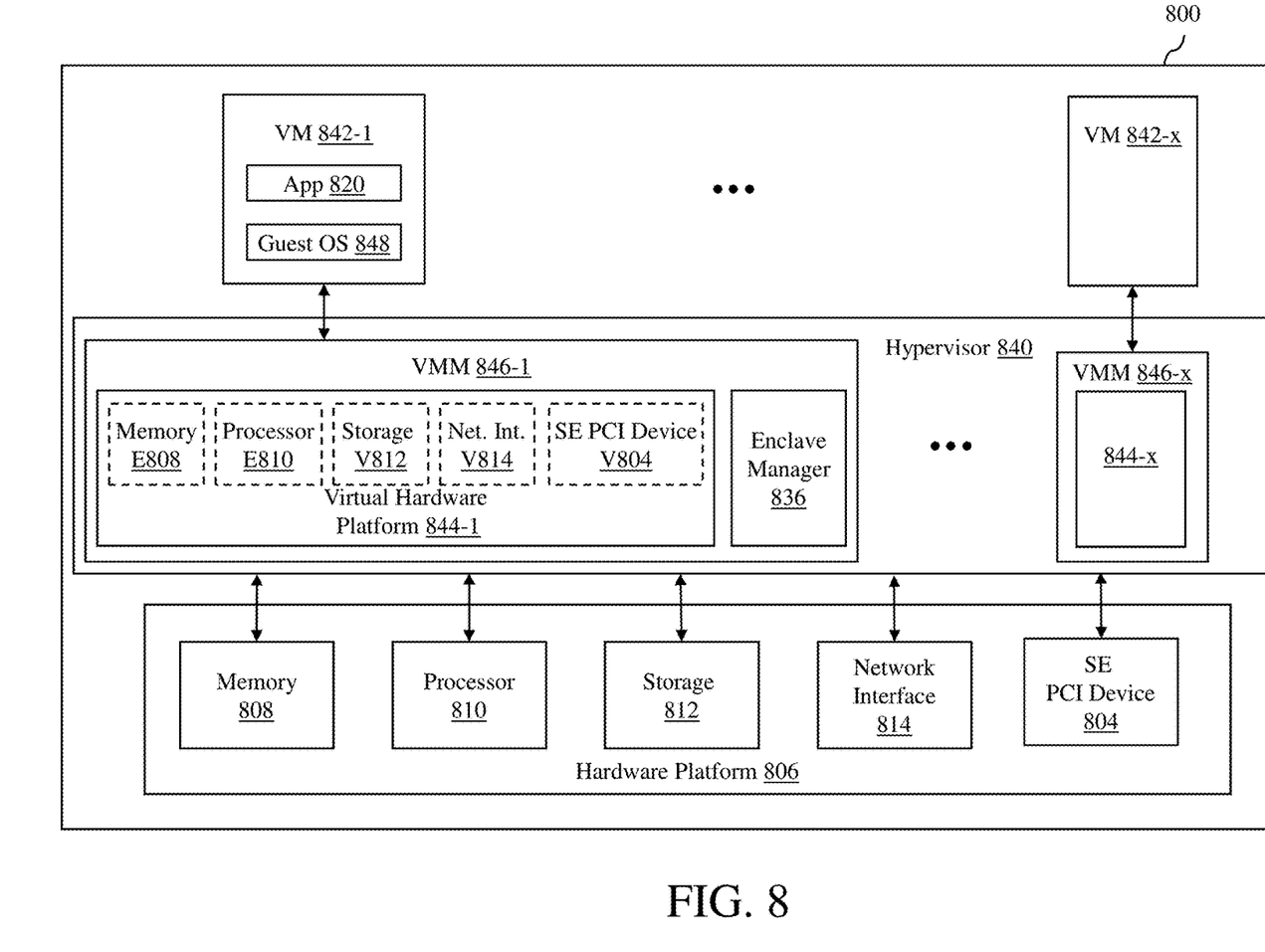
FIG. 8 is a block diagram of a computer system with a virtual SE PCI device in accordance with an embodiment of the invention.

Turning now to FIG. 8, a computer system 800 in accordance with another embodiment of the invention is shown. The computer system 800 is similar to the computer system 100 shown in FIG. 1. However, rather than a physical SE PCI device, the computer system 800 includes a virtual SE PCI device 804. The virtual SE PCI device 804 of the computer system 800 functions and operates in similar manner as the physical SE PCI device 104 of the computer system 100. It is noted here that the computer system 800 can have multiple virtual SE PCI devices for different VCIs running in the computer system 800.

Similar to the computer system 100 shown in FIG. 1, the computer system 800 includes a physical hardware platform 806, which includes at least a physical SE PCI device 804, one or more system memories 808, one or more processors 810, a storage 812, and a network interface 814. The computer system 800 further includes a virtualization software layer 840 running directly on the hardware platform 806 or on an operation system (OS) of the computer system 800. The virtualization software layer 840 can support one or more VCIs. In addition, the virtualization software layer 840 can deploy or create VCIs on demand.

In the illustrated embodiment, the virtualization software layer 840 is a hypervisor, which enables sharing of the hardware resources of the computer system 800 by VCIs in the form of VMs that are hosted by the hypervisor. One example of a hypervisor that may be used in an embodiment described herein is a VMware ESXi™ hypervisor provided as part of the VMware vSphere® solution made commercially available from VMware, Inc of Palo Alto, Calif.

The hypervisor 840 provides a device driver layer configured to map physical resources of the hardware platform 806 to "virtual" resources of each VM supported by the hypervisor such that each VM has its own corresponding virtual hardware platform. Each such virtual hardware platform provides emulated or virtualized hardware (e.g., memory, processor, storage, network interface, SE PCI device etc.) that may, for example, function as an equivalent, conventional hardware architecture for its corresponding VM. In deploying VMs, the hypervisor 840 may also install user input device drivers in each VM so that user input devices, such as mice and keyboards, may be used with the VMs.

In FIG. 8, the computer system 800 is shown to include a number of VMs 842-1 to 842-x supported by the hypervisor 840. Each of these VMs has a virtual hardware platform 844. Thus, the VM 842-1 has the virtual hardware platform 844, while the VM 114-x has the virtual hardware platform 116-x. Each of the virtual hardware platforms includes at least emulated memory E808, emulated processor E810, virtual storage V108 and virtual network interface V110, which correspond to the memory 808, the processor 810, the storage 812 and the network interface 814, respectively, of the hardware platform 806 of the computer system 800 (not shown in FIG. 8 for the virtual hardware platform 844-x). The virtual hardware platforms 844-1 to 844-x may be considered part of virtual machine monitors (VMMs) 846-1 to 846-x that implement virtual system support to coordinate operations between the hypervisor 840 and corresponding VMs 842-1 to 842-x.

The virtual hardware platforms 844-1 further includes a virtual SE PCI device V804, which is a virtualized software component that is equivalent to a physical SE PCI device, such as the physical SE PCI device 104 of the computer system 100. Thus, the virtual SE PCI device V804 includes all the components of the physical SE PCI device 104, such as the registers 128, the command queue 130, the event queue 134, the processor 122, the memory 124 and the secure monitor 126 in software form. In an embodiment, the function and operation of the virtual SE PCI device V804 are same as the physical SE PCI device 104. However, the virtual SE PCI device V804 is backed by the physical PCI device 804, which provides the actual TEE environments. Thus, the virtual SE PCI device V804 emulates a physical PCI device. The virtual hardware platforms 846-1 may also include an enclave manager 836, which is similar to the enclave manager 136 of the computer system 100 with respect to its functionality.

With the support of the hypervisor 840, the VMs 842-1 to 842-x provide isolated execution spaces for guest software. Each VM may include a guest operating system 848, and one or more guest applications 820, some of which may be secure applications that use enclaves created in their respective SE PCI device V804. The guest operating system 848 manages virtual hardware resources made available to the corresponding VM by the hypervisor 840, and, among other things, the guest operating system forms a software platform on top of which the guest applications 820 run.

The computer system 800 with the deployed VMs 842-1 to 842-x may have various software processes running in the computer system. As an example, one or more software processes may be running on the host OS of the computer system 800, one or more software processes may be running on the guest OSs 848 of the VMs as guest applications 820, and one or more software processes may be running in the hypervisor 840. Any of these software processes may use enclaves created using physical or virtual secure enclave PCI devices, as described herein, to uses as secure and trusted execution environments.

Figure 9:
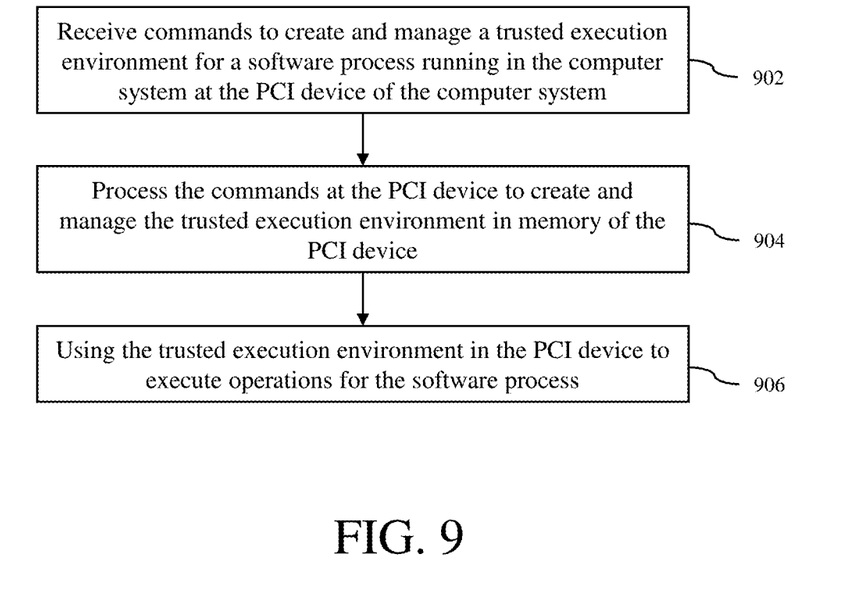
FIG. 9 is a flow diagram of a method for providing trusted execution environments in a peripheral component interconnect (PCI) device of a computer system in accordance with an embodiment of the invention.

A computer-implemented method for providing trusted execution environments in a peripheral component interconnect (PCI) device of a computer system in accordance with an embodiment of the invention is described with reference to a flow diagram of FIG. 9. At block 902, commands to create and manage a trusted execution environment for a software process running in the computer system are received at the PCI device of the computer system. At block 904, the commands are processed at the PCI device to create and manage the trusted execution environment in memory of the PCI device. At block 906, the trusted execution environment in the PCI device is used to execute operations for the software process.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for providing trusted execution environments in a peripheral component interconnect (PCI) device of a computer system, the method comprising:
   receiving commands to create and manage a trusted execution environment for a software process running in the computer system at the PCI device of the computer system;
   processing the commands at the PCI device to create and manage the trusted execution environment in memory of the PCI device, wherein the trusted execution environment is a secure memory enclave created in the memory of the PCI device; and
   using the trusted execution environment in the PCI device to execute operations for the software process.

2. The method of claim 1, wherein receiving command includes receiving a particular command to create the trusted execution environment for the software process at a command queue in the PCI device that is used to store the commands at the PCI device for processing.

3. The method of claim 2, further comprising, after the particular command is received at the command queue, using a first pointing mechanism to point to the particular command in the command queue as the most recent command added to the command queue.

4. The method of claim 3, wherein the first pointing mechanism includes a register in the PCI device that contains an offset from a command queue base physical address to point to the particular command in the command queue as the most recent command that has been added to the command queue.

5. The method of claim 4, wherein the command queue base physical address is stored in a command queue base address register.

6. The method of claim 2, further comprising, after the particular command is processed, using a pointing mechanism to point to the particular command in the command queue as the most recent processed command in the command queue.

7. The method of claim 6, wherein the pointing mechanism includes a register in the PCI device that contains an offset from a command queue base physical address to point to the particular command in the command queue as the most recent processed command in the command queue.

8. The method of claim 1, wherein the PCI device is a virtual PCI device that emulates a physical PCI device.

9. A non-transitory computer-readable storage medium containing program instructions for providing trusted execution environments in a peripheral component interconnect (PCI) device of a computer system, wherein execution of the program instructions by one or more processors of the computer system causes the one or more processors to perform steps comprising:

receiving commands to create and manage a trusted execution environment for a software process running in the computer system at the PCI device of the computer system;

processing the commands at the PCI device to create and manage the trusted execution environment in memory of the PCI device, wherein the trusted execution environment is a secure memory enclave created in the memory of the PCI device; and using the trusted execution environment in the PCI device to execute operations for the software process.

10. The computer-readable storage medium of claim 9, wherein receiving command includes receiving a particular command to create the trusted execution environment for the software process at a command queue in the PCI device that is used to store the commands at the PCI device for processing.

11. The computer-readable storage medium of claim 10, wherein the steps further comprise, after the particular command is received at the command queue, using a pointing mechanism to point to the particular command in the command queue as the most recent command added to the command queue.

12. The computer-readable storage medium of claim 11, wherein the pointing mechanism includes a register in the PCI device that includes an offset from a command queue base physical address to point to the particular command in the command queue as the most recent command that has been added to the command queue.

13. The computer-readable storage medium of claim 12, wherein the command queue base physical address is stored in a command queue base address register.

14. The computer-readable storage medium of claim 10, wherein the steps further comprise, after the particular command is processed, using a pointing mechanism to point to the particular command in the command queue as the most recent processed command in the command queue.

15. The computer-readable storage medium of claim 14, wherein the pointing mechanism includes a register in the PCI device that includes an offset from a command queue base physical address to point to the particular command in the command queue as the most recent processed command in the command queue.

16. The computer-readable storage medium of claim 9, wherein the PCI device is a virtual PCI device that emulates a physical PCI device.

17. A computer system comprising:

memory;

at least one processor; and a peripheral component interconnect (PCI) device, the PCI device being configured to:

receive commands to create and manage a trusted execution environment for a software process running in the computer system;

process the commands at the PCI device to create and manage the trusted execution environment in memory of the PCI device, wherein the trusted execution environment is a secure memory enclave created in the memory of the PCI device; and use the trusted execution environment in the PCI device to execute operations for the software process.

18. The computer system of claim 17, wherein the PCI device includes a command queue that is used to store the commands at the PCI device for processing.

19. The computer system of claim 18, wherein the command queue uses a first pointing mechanism to point to the most recent command added to the command queue and a second pointing mechanism to point to the most recent processed command in the command queue.

20. The computer system of claim 19, wherein the first pointing mechanism includes a first register in the PCI device that contains a first offset from a command queue base physical address to point to the most recent command added to the command queue and the second pointing mechanism includes a second register in the PCI device that contains a second offset from the command queue base physical address to point to the most recent processed command in the command queue.

* * * * *